United States Patent [19]

Zones et al.

[11] Patent Number: 5,225,179
[45] Date of Patent: Jul. 6, 1993

[54] METHOD OF MAKING MOLECULAR SIEVES

[75] Inventors: Stacey I. Zones, San Francisco; Yumi Nakagawa, Kensington, both of Calif.

[73] Assignee: Chevron Research and Technology Company, San Francisco, Calif.

[21] Appl. No.: 936,955

[22] Filed: Aug. 27, 1992

[51] Int. Cl.$^5$ .................... C01B 33/34; B01J 29/04
[52] U.S. Cl. .................... 423/709; 423/716; 502/62
[58] Field of Search .................... 423/709, 716; 502/62

[56] References Cited

U.S. PATENT DOCUMENTS

| | | | |
|---|---|---|---|
| 4,401,633 | 8/1983 | Sun | 423/709 |
| 4,503,024 | 3/1985 | Bourgogne et al. | 423/328 |
| 4,650,655 | 3/1987 | Chu et al. | 423/709 |
| 4,689,207 | 8/1987 | Zones | 423/332 |
| 4,818,509 | 4/1989 | Dwyer et al. | 423/709 |
| 5,053,373 | 10/1991 | Zones | 502/64 |
| 5,106,801 | 4/1992 | Zones et al. | 502/64 |
| 5,164,170 | 11/1992 | Rubin | 423/709 |

*Primary Examiner*—Carl F. Dees
*Attorney, Agent, or Firm*—R. J. Sheridan; T. G. DeJonghe

[57] ABSTRACT

A method for synthesizing molecular sieves is disclosed. The method comprises preparing an aqueous mixture comprising:

a) a source zeolite, wherein said source zeolite contains sodalite substructures and has a tetrahedra atom density of less than about 15 $TO_2$ per 1000 Å$^3$, and wherein said source zeolite has a silica/alumina mole ratio greater than 200; an alkali metal oxide; and an organic template, and wherein said aqueous mixture has a composition in terms of mole ratios of oxides falling within the following ranges:

| | | |
|---|---|---|
| $M+/SiO_2$ | = | 0.01–1.00 |
| $OH-/SiO_2$ | = | 0.15–0.80 |
| $H_2O/SiO_2$ | = | 20–120 |
| $Q/SiO_2$ | = | 0.10–1.00 |
| $SiO_2/Y_2O_3$ | > | 200 | wherein $M+$ is an alkali metal not supplied by the source zeolite, Q is an organic template, Y is aluminum from the source zeolite, and Si is silica from the source zeolite; and b) maintaining the aqueous mixture under conditions sufficient to form crystals of the molecular sieve.

19 Claims, No Drawings

METHOD OF MAKING MOLECULAR SIEVES

BACKGROUND OF THE INVENTION

1. FIELD OF THE INVENTION

The present invention relates to an improved method for the preparation of crystalline silicate molecular sieves. More particularly, the crystalline silicates are prepared from reaction formulations that use zeolitic aluminosilicates having sodalite substructures and has a tetrahedra atom density of less than about 15 $TO_2$ per 1000 Å$^3$ as the aluminum and silica source.

2. DESCRIPTION OF RELATED ART

Natural and synthetic zeolitic materials have demonstrated catalytic properties for use in various types of hydrocarbon processes. By using X-ray diffraction, certain zeolitic materials have been shown to have a crystalline structure wherein there are a large number of smaller cavities These smaller cavities may be interconnected by a number of still smaller channels or pores. Variations in pore dimensions and shapes have been found to effect the adsorptive and catalytic properties of the zeolites. Only molecules of certain dimensions and shapes are able to fit into the pores of a particular zeolite while molecules of a larger dimension or of a different shape are unable to enter the pore in the zeolite crystals. Since the pores in the zeolite accept molecules of certain dimensions while rejecting those of a larger dimension, these zeolites have come to be known as "molecular sieves" and are utilized in a variety of ways to take advantage of these properties. These cavities and pores have been demonstrated to be of a uniform size within a specific zeolite.

Because of their unique molecular sieving characteristics, as well as their potentially acidic nature, zeolites are especially useful in hydrocarbon processing as adsorbents and as catalysts for cracking, reforming, and other hydrocarbon conversion reactions.

Such molecular sieves, both natural and synthetic, include a wide variety of positive ion-containing crystalline aluminosilicates. These aluminosilicates can be described as a rigged three-dimensional framework of $SiO_4$ and $AlO_4$ in which the tetrahedra are cross-linked through the sharing of oxygen atoms whereby the ratio of the total aluminum and silicon atoms to oxygen atoms is 1:2. The electrovalence of the tetrahedra containing aluminum is balanced by the inclusion in the crystal of a cation, for example by the inclusion of an alkali metal or an alkaline earth metal cation. This can be expressed by the relationship of aluminum to the cations, wherein the ratio of aluminum to the number of various cations, such as Ca/2, Sr/2, Na, K, Cs or Li, is equal to unity. One cation may be exchanged either entirely or partially with another type of cation utilizing ion exchange techniques well know to those skilled in the art. By suitable selection of the cation, it has been possible to vary the properties of a given aluminosilicate.

Prior art techniques have resulted in the formation of a great variety of synthetic zeolites. The zeolites have come to be designated by letter or other convenient symbols, for example: zeolite A (U.S. Pat. No. 2,882,243 issued on Apr. 14, 1959 to Milton), zeolite X (U.S. Pat. No. 2,882,244 issued on Apr. 14, 1959 to Milton), zeolite Y (U.S. Pat. No. 3,130,007 Apr. 21, 1964 to Breck), zeolite ZK-5 (U.S. Pat. No. 3,247,195 issued on Apr. 19, 1966 to Kerr), zeolite ZK-4 (U.S. Pat. No. 3,314,752 issued on Apr. 18, 1967 to Kerr), and SSZ-16 (described in U.S. Pat. No. 4,508,837 issued to Zones on Apr. 2, 1985.

Generally, crystalline silicates are synthesized by contacting an active source of one or more oxides selected from the group consisting of monovalent element oxides, divalent element oxides, trivalent element oxides, and tetravalent element oxides, an organic template, and water. Then, under conditions suitable for crystallization and with specific ratios between the precursors of the zeolites, the desired zeolite can be crystallized.

It has been found that crystalline components are generally not good reagents in zeolite synthesis. Occasionally, there are exceptional materials which turn out to be very useful reactants. This may come as a result of such features as very high surface area for the crystalline material, or there may be an unusual instability in the lattice framework. It is also thought that very small crystal size can also be a helpful feature.

It was previously shown in U.S. Pat. No. 4,689,207 that a crystalline silica, Magadiite was a useful reactant for high silica zeolite synthesis. U.S. Pat. No. 4,503,024 also discloses a method of preparing chabazite, merlinoite, edingtonite, ZSM-5, and ZSM-11 from the natural and synthetic zeolites mordenite, ferrierite, clinoptilolite, zeolite X and zeolite Y. The entire disclosures of each being incorporated herein by reference.

For a given zeolite structure it is not always possible to prepare the zeolite over a wide $SiO_2/Al_2O_3$ compositional range. While the zeolite is largely composed of $SiO_2$, it is the substitution of aluminum for silica, which imparts acid characteristics to the zeolites. In attempting to modify the $SiO_2/Al_2O_3$ molar ratio to a desired range, the prior art teaches several methods for replacing framework aluminum with other elements. These methods largely comprise techniques where alumina is removed from the crystalline zeolite structure thereby reducing the acidity of the zeolite. U.S. Pat. No. 5,098,687 discloses a process for removing framework aluminum from zeolites and substituting iron and/or titanium. Other methods include ion exchanging the aluminum using acid or base or combinations of both methods.

Examples of the above methods include: U.S. Pat. No. 3,620,960 (treatment of the zeolite with molybdenum fluoride); U.S. Pat. No. 3,630,965 (treatment of the zeolite with hydrofluoric acid); U.S. Pat. No. 3,644,220 (treatment of the zeolite with volatile halides selected from the group consisting of aluminum, zirconium, titanium, tin, molybdenum, tungsten, chromium, vanadium, antimony, bismuth, iron, platinum group metals and rare earths); U.S. Pat. No. 3,575,887 and U.S. Pat. No. 3,702,312 (treatment of the zeolite with fluorides and chlorides). U.S. Pat. No. 3,699,056 (treatment of the zeolite with halogenated hydrocarbons); U.S. Pat. No. 4,427,788 (ammoniacal aluminum fluoride solution for treatment of zeolite having silica/alumina ratio greater than 100).

Applicants have now unexpectedly discovered that it is possible to prepare a molecular sieve from a reaction mixture without necessarily resorting to subsequent dealumination process steps.

It is an object of the invention to provide a method for synthesizing a variety of molecular sieves using, as a reagent, another zeolite as the sole source of alumina and silica. The source zeolite has a faujasitic type structure with a $SiO_2/Al_2O_3$ mole ratio greater than 200.

This and other objects are accomplished by the invention below.

SUMMARY OF THE INVENTION

The present method embodiment of the invention relates to the synthesis of molecular sieves. The source of aluminum and silica used in the molecular sieve is provided by a source zeolite. The method comprises preparing an aqueous mixture comprising a source zeolite, wherein said source zeolite contains sodalite substructures and has a tetrahedra atom density of less than about 15 $TO_2$ per 1000 $Å^3$, and wherein said source zeolite has a silica/alumina mole ratio greater than 200; an alkali metal oxide; and an organic template, and wherein said aqueous mixture has a composition in terms of mole ratios of oxides falling within the following ranges:

| | | |
|---|---|---|
| $M+/SiO_2$ | = | 0.01–1.00 |
| $OH-/SiO_2$ | = | 0.15–0.80 |
| $H_2O/SiO_2$ | = | 20–120 |
| $Q/SiO_2$ | = | 0.10–1.00 |
| $SiO_2/Y_2O_3$ | > | 200 | wherein M+ is an alkali metal not supplied by the source zeolite, Q is an organic template, Y is aluminum from the source zeolite, and Si is silica from the source zeolite; and maintaining said aqueous mixture under conditions sufficient to form crystals of a molecular sieve. Preferably, the molecular sieve has a silica/alumina mole ratio greater than about 200.

Among other factors, the essence of the present invention resides in the discovery that a source zeolite, which has the above described characteristics, can be used as a reactant in the synthesis of molecular sieves to supply the silica and alumina, without having to use aluminum and silica from sources known in the art of molecular sieve synthesis. The full scope of the present invention will become apparent to those in the art from the following detailed description and the examples herein.

DETAILED DESCRIPTION OF THE INVENTION

In its method embodiment, the present invention allows for the preparation of crystalline silicates having a $SiO_2/Al_2O_3$ molar ratio greater than about 200 without having to use aluminum and silica from other sources.

In practice, in addition to the above mentioned steps, the process may be carried out by recovering the crystals of the molecular sieve. These crystals may then be calcined to remove any water or template that may be occluding the molecular sieve's pores.

The term "molecular sieve" refers to a material prepared according to the present invention having a fixed, open-network structure, usually crystalline, that may be used to separate hydrocarbons or other mixtures by selective occlusion of one or more of the constituents, or may be used as a catalyst in a catalytic conversion process.

The term "silicate" means a zeolite that is essentially free of alumina. The term "essentially free of alumina" is used because it is very difficult to prepare reaction mixtures where aluminum is not present, especially when commercial sources are used; aluminum is almost always present to some degree. Thus, this term means that additional aluminum is not intentionally added to the reaction mixture, other than that present in the source zeolite.

Molecular sieves made in accordance with the present invention have a silica to alumina mole ratio greater than about 200, preferably greater than about 300, and most preferably greater than about 500. Crystalline silicate zeolites which may be prepared in accordance herewith include those which will crystallize from silica rich reaction mixtures. Nonlimiting examples of such zeolites include SSZ-24, ZSM-39, SSZ-15, and SSZ-31.

Zeolite SSZ-24 and the conventional preparation thereof is described in U.S. Pat. No. 5,114,565, issued on May 19, 1992 to Zones. Zeolite ZSM-39 and the conventional preparation thereof is described in U.S. Pat. No. 4,259,306 issued on Mar. 31, 1981 to Pelrine. Zeolite SSZ-15 and the conventional preparation thereof is described in U.S. Pat. No. 4,610,854 issued on Sep. 9, 1986 to Zones. Zeolite SSZ-31 and the conventional preparation thereof is described in copending application having the U.S. Ser. No. 198,414 filed May 25, 1988 (now abandoned). The entire disclosure of each patent and patent application is incorporated herein by reference.

As discussed above, the present invention contemplates preparation of such zeolites wherein the mole ratio of aluminum to silica may be different than disclosed in the patents. The incorporation of the identified patents should therefore not be construed as limiting the disclosed crystalline zeolites to those having the specific silica/aluminum mole ratios discussed therein. It is the crystal structure, as identified by the X-ray diffraction "fingerprint," which established the identity of the specific crystalline zeolite material. In some instances, the lattice constants of the above phases may be seen to be enlarged as a result of aluminum incorporation.

The term "sodalite substructures" used herein means a truncated octahedron having 36 edges, 24 vertices, 6 square faces, and 8 hexagonal faces with a tetrahedral atom located at each vertex. Oxygen atoms are located between the tetrahedral atoms but not necessarily on the edge.

The term "source zeolite" used herein means an aluminosilicate which is the sole source of silica and aluminum used in preparing the different product zeolite. The term "product zeolite" used herein means the resulting crystalline zeolite formed from the reaction mixture.

The source zeolite used in accordance with the method embodiment of the invention contains sodalite substructures, has a tetrahedra atom density of less than about 15 $TO_2/1000$ $Å^3$, and has a silica to alumina mole ratio greater than 200. Preferably, the source zeolite is in its sodium or ammonium form. Non-limiting examples of suitable source zeolites that may be used in accordance with the present method include dealuminated zeolite A, N-A, ZK-4, faujasite, X, Y, ZK-5, and rho. Most preferably, the source zeolites are A, X, Y, and rho. Dealuminating techniques of the source zeolites are well known in the art.

Zeolite A and the conventional preparation thereof is described in U.S. Pat. No. 2,882,243. Zeolite N-A and the conventional preparation thereof is described in U.S. Pat. No. 3,306,922. Zeolite ZK-4 and the conventional preparation thereof is described in U.S. Pat. No. 3,247,195. Zeolite X and the conventional preparation thereof is described in U.S. Pat. No. 2,882,244. Zeolite Y and the conventional preparation thereof is described in U.S. Pat. No. 3,130,007. Zeolite ZK-5 and the conventional preparation thereof is described in U.S. Pat. No. 3,247,195. Zeolite rho and the conventional preparation thereof is described in U.S. Pat. No. 3,904,738. The entire disclosure of each being incorporated herein by reference.

Tetrahedra atom densities for various zeolitic structures is given in more detail on pages 48-51 of "Zeolite Molecular Sieves" by D. W. Breck (1984), Robert E. Krieger Publishing Company, Inc., the disclosure of which is incorporated herein by reference.

The use of the above described source zeolites allows a relatively smaller concentration of the organic template to be present in the reaction mixture. Because one can use lower amounts of the organic template, and because the source zeolite may be used in the ammonium form as well as the alkali metal form, preferably the sodium form or as mixtures thereof, lower cost crystalline zeolites may be obtained.

While not intending to be limited to any theory, it is believed that the source zeolites may contribute from within its structure the correct aluminosilicate building units which can be used to prepare a number of high silica zeolites. By utilizing the highly porous aspects of the source zeolite's structure, and in the presence of quaternary organic ammonium cations, the source zeolite can be converted into a new three-dimensional zeolite structure. Due to the relatively low hydrothermal stability of the source zeolite the crystalline product zeolites form relatively rapidly, which allows for the formation of small crystal systems compared with reactions using the same templates and the products obtained using normal or prior art zeolite preparations.

The sources of alkali metal oxide used in accordance with the invention may be, for example, sodium, lithium or potassium hydroxides, oxides, carbonates, halides (e.g. chlorides and bromides), sulfates, nitrates, acetates, silicates, aluminates, phosphates, and salts of carboxylic acids.

The sources of the organic template cations, depending on the particular zeolite product to result from crystallization from the reaction mixture may be primary, secondary or tertiary amines or quaternary ammonium cation compounds. Preferably, the template is an organic quaternary ammonium cation compound and includes those having the following formulas:

$$R_1R_2R_3R_4N+X-$$

wherein $R_1-R_4$ is alkyl of from 1 to 20 carbon atoms, heteroalkyl of from 1 to 20 carbon atoms, aryl of from 6 to 8 carbon atoms, heteroaryl of from 5 to 8 carbon atoms, cycloalkyl of from 3 to 8 carbon atoms, cycloheteroalkyl of from 3 to 8 carbon atoms or combinations thereof and polycyclic molecules as well; X is an anion which is not detrimental to formation of the zeolite, and may be fluoride, chloride, bromide, iodide, hydroxide, acetate, sulfate, carboxylate, etc.

Non-limiting examples of these types of compounds include salts of tetramethylammonium, tetraethylammonium, tetrapropylammonium, tetrabutylammonium, dibenzyldiethylammonium, benzyltrimethylammonium, trimethylcyclopentylammonium, trimethylfurfurylammonium, dimethylethylcyclopentylammonium, ethyltrimethylammonium and chlorine, bromine, or iodine; or $$R'_nN+R''$$

wherein R' is a lower linear alkyl of from 1 to 3 carbon atoms, n is from 0 to 3 and R" is a hydrocarbon group containing 3 to 15 carbon atoms which is attached to the N+ and forms an alicyclic, heteroalicyclic or heteroaromatic structure, and X is as defined above. Non-limiting examples of these types of compounds include spiro pyrrolidinium cation, N-methyl quinuclidinium cation, N,N dimethylpyrrolidinium cation, and N,N,N trimethyl cyclopentylammonium cation; or compounds containing multiple cationic centers which include those having the formula:

$$[(R)_3N+(Z)_{n'}N+(R)_3](X-)_2$$

or $$[R''N+(Z)_{n'}N+R''](X-)_2$$

wherein R,R", and X are as defined above, Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n' is a number of from 1 to about 50. Non-limiting examples of such multiple cationic center containing compounds include:

$$[(CH_3)_3N+(CH_2)_6N+(CH_3)_3](Cl-)_2,$$

$$[(C_3H_7)_3N+(CH_2)_{10}N+(C_3H_7)_3](Cl-)_2,$$

$$[(C_6H_5)_3N+(C_2H_4)_{16}N+(C_6H_5)_3](OH-)_2,$$

$$[(C_{18}H_{37})_3N+(C_2H_2)_3N+(CH_3)_3](Cl-)_2,$$

$$[(C_2H_5)_3N+(C_6H_4)N+(C_2H_5)_3](Br-)_2,$$

$$[(C_2H_3)_3N+(CH_2)_{50}N+(C_2H_3)_3](OH-)_2,$$

$$[(CH_3)_3N+(CH_2)_6N+(CH_3)_3](Cl-)_2.$$

In addition to quaternary ammonium cations, other types of templates which are soluble and stable under basic pH conditions may be used in this reaction mixture.

When preparing a targeted crystalline silicate, reference should be made to available literature describing standard zeolitic preparation techniques for producing the crystalline silicate, but as will be well known to those skilled in the art of zeolite crystallization, not all possible combinations within the broadly defined composition range will be equally effective. Some combinations will indeed be unsuccessful or impractical. However, such experimentation is not beyond the ordinary level of skill or knowledge of one in the art.

Reaction conditions suitable to form crystals of the desired crystalline silicate include heating the reaction mixture to a temperature that is from about 70° C. to 300° C. for a period of time that is from about 1 hour to 180 days. Preferably, the temperature is from about 120° C. to about 270° C. During the crystallization of the zeolites, the reaction mixture may be stirred or allowed to crystallize without the use of agitation, if desired. Additionally, if desired, seed crystals of the desired zeolite may be added to the reaction mixture.

Once the zeolite crystals have formed, the solid product may be separated from the reaction mixture by standard mechanical separation techniques such as filtration. The crystals are water-washed and then dried, e.g., at 90° C. to 150° C. for 8 to 24 hours, to obtain the as synthesized, zeolite crystals. The drying step can be performed at atmospheric or subatmospheric pressures. The organic quaternary amine cation moiety is quite readily thermally decomposed and removed from the zeolite by calcination in an oxidizing atmosphere (air) or inert atmosphere at temperatures from about 480° F. to about 1500° F.

The residual alkali metal in the product can be removed by washing with alkali metal halide solution or an aqueous acid solution such as hydrochloric acid.

The zeolites prepared by the present method may be used as a catalyst for organic compound conversion in the hydrogen form or they may be base exchanged or impregnated to contain ammonium or a metal cation complement. It is desirable to calcine the zeolite after base exchange. The metal cations that may be present include any of the cations of the metals of Groups I through VIII of the Periodic Chart of the Elements especially rare earth metals. However, in the case of Group 1A metals, the cation content should should in no case be so large as to effectively inactivate the catalyst.

As in the case of many catalysts, it is desirable to incorporate the zeolite prepared by the present method with one or more other materials resistant to the temperature and other conditions employed in some organic compound conversion processes. Such matrix materials include active and inactive materials and synthetic or naturally occurring zeolites as well as inorganic material such as clays, silica and/or metal oxides. The latter may be either naturally occurring or in the form of gelatinous precipitates, sols or gels including mixtures of silica and metal oxides. Inactive materials suitably serve as diluents to control the amount of conversion in a given process so that products can be obtained economically and orderly without employing other means for controlling the rate of reaction. Frequently, zeolite materials have been incorporated into naturally occurring clays, e.g. bentonite and kaolin. These materials, i.e. clays, oxides, etc., function, in part, as binders for the catalyst. It may be desirable to provide a catalyst having good crush strength so it may be used in a process where the catalyst is subjected to rough handling, such as in a fluidized system, which may tend to break the catalyst down into powder-like materials which cause problems in processing.

Naturally occurring clays which can be composited with the zeolites prepared hereby include the montmorillonite and kaolin families, which include the sub-bentonites and the kaolins commonly known as Dixie, McNammee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites made hereby can be composited with one or more porous matrix materials such as alumina, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel. A mixture of these components, one with the other and/or with a clay, could also be used. The relative proportions of zeolite and inorganic oxide gel matrix and/or clay vary widely with the crystalline aluminosilicate content ranging from about 1 to about 90 percent by weight and more usually in the range of about 2 to about 50 percent by weight of the composite.

Zeolites prepared by the present method are valuable catalysts or catalyst components in various organic compound conversion processes, e.g. hydrocarbon compound and oxygenate, such as methanol, conversion processes. Such processes include, for example, alkylation of aromatics with olefins; aromatization of normally gaseous olefins and paraffins; aromatization of normally liquid low molecular weight paraffins and olefins; isomerization of aromatics, paraffins and olefins; disproportionation of aromatics; transalkylation of aromatics, oligomerization of olefins; cracking and hydrocracking. All of the foregoing catalytic processes are of value since they result in upgrading of the organic charge being processed.

The process for upgrading reformates wherein a zeolite prepared in accordance herewith is employed as catalyst generally involves contact during processing with a reformate or reformer effluent, with or without added hydrogen, at a temperature between 500° F. and about 1100° F. and preferably between about 550° F. and about 1000° F. The reaction pressure in such operation is generally within the range of about 25 and about 2000 psig and preferably about 50 to about 1000 psig. The liquid hourly space velocity, i.e. the liquid volume of hydrocarbon per hour per volume of catalyst, is between about 0.1 and about 250, and preferably between about 1 and 100. Although hydrogen is not essential to this process, when it is used the molar ratio of hydrogen to hydrocarbon charge employed is between about 0.1 and about 80 and preferably between about 1 and about 10.

Oligomerization of olefins, i.e. olefins having 2 to 10 carbon atoms, is effectively carried out with the zeolite prepared in accordance herewith as catalyst. Such reaction is suitably effected at a temperature between about 550° F. and about 1150° F., a pressure between about 0.01 and about 1000 psig and a weight hourly space velocity within the approximate range of 0.1 to 1000.

Alkylation of aromatic hydrocarbons, e.g. benzene, with an alkylating agent such as an alkyl halide, an alcohol or an olefin, is also readily effected in the presence of the presently made zeolite as catalyst with reduced aging. Alkylation conditions include a temperature between about 400° F. and about 1000° F., a pressure between about 25 and about 1000 psig, an aromatic hydrocarbon/alkylating agent mole ratio of 2 to 200 and an alkylating agent weight hourly space velocity within the approximate range of 0.5 to 50.

Xylene isomerization is another reaction suitably conducted in the presence of the zeolite made in accordance herewith as catalyst. Isomerization conditions include a temperature between about 300° F. and about 900° F., a pressure between about 25 and about 1000 psig and a weight hourly space velocity within the approximate range of 0.2 to 100.

Aromatics, such as, for example, toluene, may be disproportionated in the presence of the presently made zeolite under a temperature of from about 450° F. to about 1100° F., a pressure of from about 50 psig to about 800 psig and a liquid hourly space velocity within the approximate range of about 0.1 to about 20. Aliphatic hydrocarbons may also be disproportionated in the presence of zeolite prepared by the present improved method at a temperature of from about 350° F. to about 900° F., a pressure between 0 and 3,000 psig and a liquid hourly space velocity of between about 0.01 and about 5.

When the conversion of organic compounds with the presently made zeolite as catalyst is cracking, catalytic conversion conditions should be maintained within certain ranges, including a temperature of from about 700° F. to about 1200° F., preferably from about 800° F. to about 1000° F., a pressure of from about atmospheric to about 200 psig, and a liquid hourly space velocity of from about 0.5 $hr^{-1}$ to about 50 $hr^{-1}$, preferably from about 1 $hr^{-1}$ to about 10 $hr^{-1}$. When the conversion is hydrocracking, catalytic conversion conditions should be maintained within somewhat different ranges, including a temperature of from about 400° F. to about 1000° F., preferably from about 500° F. to about 850° F., a pressure of from about 500 psig to about 3500 psig, a liquid hourly space velocity of from about 0.1 $hr^{-1}$ to about 10 $hr^{-1}$, preferably from about 0.2 $hr^{-1}$ to about 5 $hr^{-1}$, and a hydrogen/hydrocarbon ratio of from about 1000 scf/bbl to about 20,000 scf/bbl, preferably from about 3,000 scf/bbl to about 10,000 scf/bbl.

It may be desirable in some instances to add a hydrogenation or a dehydrogenation component to the zeolites prepared in accordance herewith. The hydrogenation/dehydrogenation component employed is not critical and can range from about 0.01 to about 30 weight percent based on the entire catalyst. A variety of hydrogenation components may be combined with either the zeolite and/or matrix in any feasible manner which affords intimate contact of the components, employing well known techniques such as base co-gelation, mechanical admixture of one component with the other and the like. The hydrogenation component can include metals, oxides and sulfides of metals of the Periodic Chart of the Elements (Fisher Scientific Company, Cat. No. 5-702-10, 1978) which fall in Group VIA including chromium, molybdenum, tungsten and the like; Group IIB including zinc and cadmium; Group VIII including cobalt, nickel, platinum, palladium, ruthenium, rhodium, osmium and iridium; Group IVB such as germanium and tin and combinations of metals, sulfides and oxides of metals of Group VIA and VIII, such as nickel-tungsten-sulfide, cobalt oxide-molybdenum oxide and the like. Pretreatment before use varies depending on the hydrogenation component present. For example, with components such as nickel-tungsten, cobalt-molybdenum, platinum and palladium, the catalyst may desirably be sulfided. With metals like platinum or palladium, a hydrogenation step may also be employed. These techniques are well known in the art and are accomplished in a conventional manner.

The above descriptions and particularly, the examples are set forth for purposes of illustration only and are not meant to limit the invention to any theories, but instead is limited to what is claimed herein. Many variations and modifications thereof will be apparent to those of ordinary skill in the art and can be made without departing from the spirit and scope of the invention herein described.

EXAMPLES 1-4

Table I shows the properties of various source zeolite materials considered. Table II shows that product zeolites having a silica/alumina greater than 200 are obtained when using a dealuminated Y zeolite in accordance with the method of the invention as the source of alumina and silica in the reaction mixture. The templates used in Examples 1-4 are specifically described in Table III.

In these examples the dealuminated Y zeolite supplied by TOSOH of Japan and identified as HUA 390A. The Y zeolite is the entire silica and aluminum source ($SiO_2$/$Al_2O_3 \sim 400$) for the synthesis of the product zeolite. The hydroxide content is lowered and the products obtained are consistent with some known very high silica crystalline zeolites.

0.9 grams of calcined TOSOH HUA 390A zeolite was added to 7.5 mL of water and 1.5 grams of 1M NaOH in a Parr 4749 pressure reactor. Three grams of the template, as identified, were added and the reactor was sealed and heated for 72 hours at 150° C. without agitation. Upon cooling, the product was recovered by filtration and dried after several washings. The zeolite product recovered was identified by X-ray diffraction.

TABLE I

| Zeolite | Source Zeolites Framework Density g/cc[a] |
| --- | --- |
| A | 1.27 |
| N-A | 1.3 |
| ZK-4 | 1.3 |
| Faujasite | 1.27 |
| X | 1.31 |
| Y | 1.25-1.29 |
| ZK-5 | 1.46 |
| Rho | 1.43 |

[a]The framework density is based on the dimensions of the unit cell of the hydrated zeolite and framework contents only. Multiplication by 10 gives the density in units of tetrahedra/1000 Å³.

TABLE II

| Example | Template | Source Zeolite | Temp. | Zeolite Product | $SiO_2/Al_2O_3$ |
| --- | --- | --- | --- | --- | --- |
| 1 | T06 | 390A | 150 | SSZ-24 | >250 |
| 2 | G16 | 390A | 145 | ZSM-39 | >250 |
| 3 | B09 | 390A | 195 | SSZ-15 | >250 |
| 4 | M47 | 390A | 170 | SSZ-31 | >250 |

TABLE III

Organic Template Cations

B09

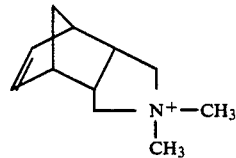

G16

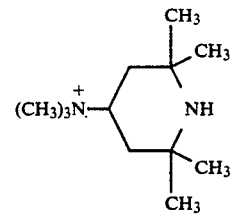

M47

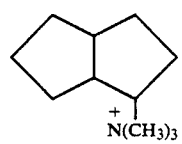

TABLE III-continued

Organic Template Cations

T06

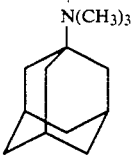

What is claimed is:

1. A method for preparing molecular sieves comprising:
   (a) preparing an aqueous mixture comprising: a source zeolite, wherein said source zeolite contains sodalite substructures and has a tetrahedra atom density of less than about 15 $TO_2$ per 1000 $Å^3$, and wherein said source zeolite has a silica/alumina mole ratio greater than 200; an alkali metal oxide; and an organic template, and wherein said aqueous mixture has a composition in terms of mole ratios of oxides falling within the following ranges:

| | | |
|---|---|---|
| $M+/SiO_2$ | = | 0.01–1.00 |
| $OH-/SiO_2$ | = | 0.15–0.80 |
| $H_2O/SiO_2$ | = | 20–120 |
| $Q/SiO_2$ | = | 0.10–1.00 |
| $SiO_2/Y_2O_3$ | > | 200 | wherein M+ is an alkali metal not supplied by the source zeolite, Q is an organic template, Y is aluminum from the source zeolite, and Si is silica from the source zeolite; and
   (b) maintaining the aqueous mixture under conditions sufficient to form crystals of the molecular sieve.

2. The method in accordance with claim 1, wherein said source zeolite is in the sodium or ammonium form.

3. The method in accordance with claim 1, further comprising recovering said crystals of the product crystalline silicate.

4. The method in accordance with claim 3, further comprising calcining the crystals at a temperature from about 480° F. to about 1500° F.

5. The method in accordance with claim 1, wherein said source zeolite is selected from the group of zeolites consisting of A, N-A, ZK-4, faujasite, X, Y, ZK-5, and rho.

6. The method in accordance with claim 5, wherein said source zeolite is dealuminated Y zeolite.

7. The method in accordance with claim 1, wherein said crystals have a silica/alumina mole ratio greater than about 300.

8. The method in accordance with claim 1, wherein said crystals have a silica/alumina mole ratio greater than about 500.

9. The method in accordance with claim 1, wherein the organic template is a quaternary organic ammonium cation.

10. The method of claim 9 wherein the quaternary organic ammonium cation is derived from compounds having the formula:

$$R_1R_2R_3R_4N+X-$$

wherein $R_1$–$R_4$ is alkyl of from 1 to 20 carbon atoms, heteroalkyl of from 1 to 20 carbon atoms, aryl of from 6 to 8 carbon atoms, heteroaryl of from 5 to 8 carbon atoms, cycloalkyl of from 3 to 8 carbon atoms, cycloheteroalkyl of from 3 to 8 carbon atoms or combinations thereof; and X is an anion which is not detrimental to the formation of the molecular sieve.

11. The method of claim 9 wherein the quaternary organic ammonium cation is derived from compounds having the formula:

$$R'_nN+R''$$

wherein R' is a lower linear alkyl of from 1 to 3 carbon atoms; n is from 0 to 3; and R" is a hydrocarbon group containing 3 to 15 carbon atoms which is attached to the N+ and forms an alicyclic, heteroalicyclic or heteroaromatic structure; and X is an anion.

12. The method of claim 9 wherein the quaternary organic ammonium cation is derived from compounds having the formula:

$$[(R)_3N+(Z)_n\cdot N+(R)_3](X-)_2$$

or $$[R''N+(Z)_n\cdot N+R''](X-)_2$$

wherein R is alkyl of from 1 to 20 carbon atoms, heteroalkyl of from 1 to 20 carbon atoms, aryl of from 6 to 8 carbon atoms, heteroaryl of from 5 to 8 carbon atoms, cycloalkyl of from 3 to 8 carbon atoms, cycloheteroalkyl of from 3 to 8 carbon atoms or combinations thereof; R" is a hydrocarbon group containing 3 to 15 carbon atoms which is attached to the N+ and forms an alicyclic, heteroalicyclic or heteroaromatic structure; Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl; n is a number of from 1 to about 50; and X is an anion which is not detrimental to the formation of the molecular sieve.

13. The mixture in accordance with claim 9, wherein said organic template is selected from the group consisting of the templates identified in Table III.

14. The method in accordance with claim 1, wherein said molecular sieve is a crystalline aluminosilicate.

15. The method in accordance with claim 1, wherein said molecular sieve is a crystalline silicate.

16. The method in accordance with claim 1, wherein said molecular sieve prepared is SSZ-24.

17. The method in accordance with claim 1, wherein said molecular sieve prepared is SSZ-15.

18. The method in accordance with claim 1, wherein said molecular sieve prepared is SSZ-31.

19. The method in accordance with claim 1, wherein said molecular sieve prepared is ZSM-39.

* * * * *